Aug. 22, 1933.　　　F. E. ULLERY　　　1,923,128
SHOCK ABSORBER
Filed March 10, 1932　　2 Sheets-Sheet 1
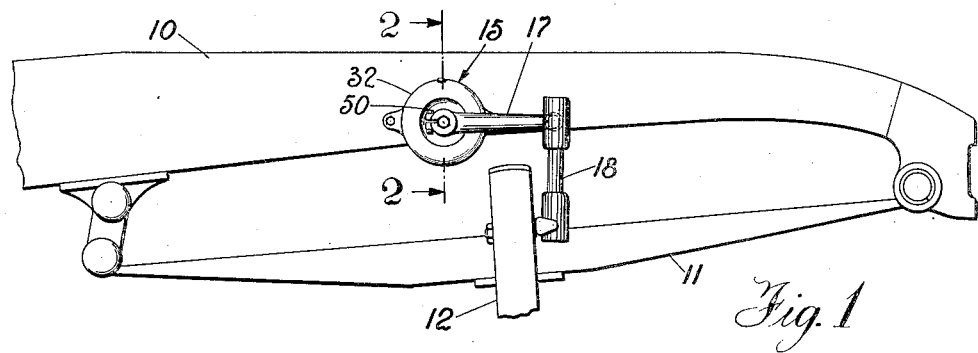
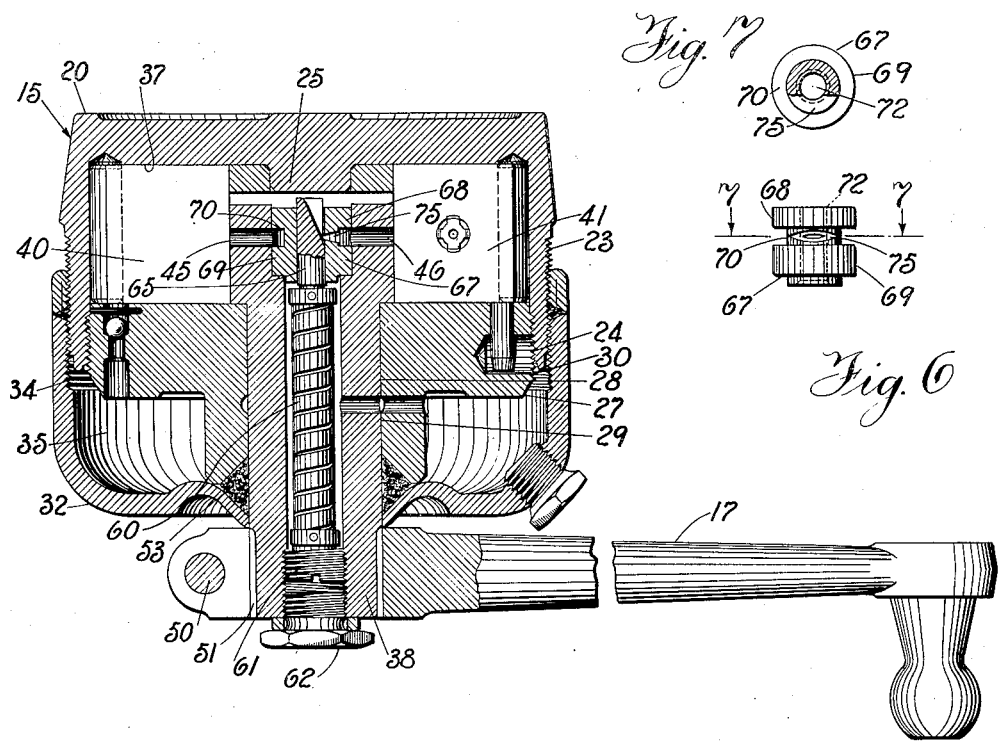
INVENTOR.
Fred E. Ullery
BY
ATTORNEYS.

Aug. 22, 1933.  F. E. ULLERY  1,923,128
SHOCK ABSORBER
Filed March 10, 1932   2 Sheets-Sheet 2
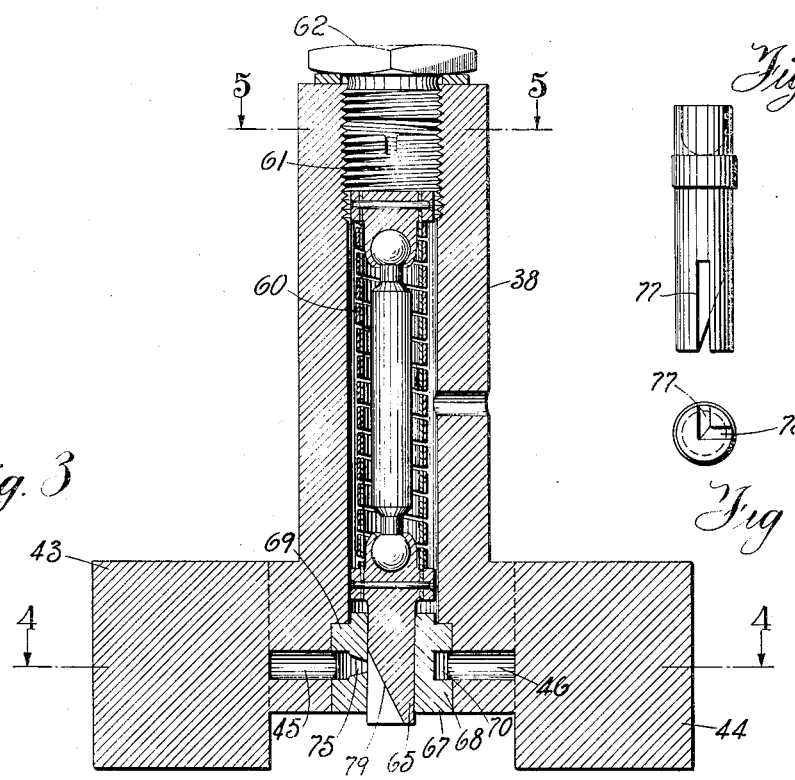

Patented Aug. 22, 1933

1,923,128

UNITED STATES PATENT OFFICE 1,923,128

SHOCK ABSORBER

Fred E. Ullery, South Bend, Ind., assignor to The Studebaker Corporation, South Bend, Ind., a Corporation of New Jersey Application March 10, 1932. Serial No. 597,969

6 Claims. (Cl. 236—93)

This invention relates to a shock absorber or rebound dampener for an automative vehicle, and particularly to a thermostatically controlled valve for such a shock absorber or rebound dampener, and has for its principal object the provision of a thermostatically controlled valve which will automatically regulate the resistance of the dampener to rebound of the vehicle, to give the rebound dampener a consistent dampening action over the entire range of temperature to which it may be subjected.

A further object is the provision of a shock absorber or rebound dampener having a thermostatically controlled valve which is effective to regulate the action of the dampener to a consistent dampening action over a greater range of temperatures than that of dampeners now in use.

A still further object is the provision of a shock absorber or rebound dampener having a thermostatically controlled regulating valve that is fully automatic in operation and requires no thought or effort from the driver of the vehicle to give the best dampening action for any particular set of conditions.

It is also an object to provide a device of the character described which is economical to manufacture, easy to install and which will not readily get out of order in use.

Other objects and advantages will appear as the description proceeds.

The accompanying drawings show a single mechanical embodiment of the device of this invention. The drawing, however, is to be taken as illustrative only and not as limiting the invention, the scope of which is to be measured entirely by the scope of the subjoined claims.

In the drawings:

Figure 1 is an elevational view of a portion of the frame and spring construction of an automotive vehicle showing a shock absorber or vibration dampener constructed according to the idea of this invention applied thereto.

Figure 2 is a sectional view on the line 2—2 of Figure 1 through a shock absorber or vibration dampener as illustrated in Figure 1, showing a thermostatically controlled valve constructed according to the idea of this invention incorporated therein.

Figure 3 is a sectional view on an enlarged scale of the rotary piston and thermostatically controlled valve of the shock absorber or rebound dampener illustrated in Figure 2.

Figure 4 is a sectional view on the line 4—4 of Figure 3.

Figure 5 is a sectional view on the line 5—5 of Figure 3.

Figure 6 is an elevational view of a portion of the thermostatically controlled valve constructed according to the idea of this invention.

Figure 7 is a sectional view on the line 7—7 of Figure 6.

Figure 8 is an elevation or side view of a somewhat modified form of another portion of the thermostatically controlled valve, and Figure 9 is an end view of the portion of the valve illustrated in Figure 8.

Referring to the drawing in detail, and particularly to Figure 1, the numeral 10 indicates a portion of the vehicle frame suspended or supported on an axle 12 by means of a spring 11. The shock absorber or rebound dampener generally indicated at 15 is rigidly supported on the frame 10 and is connected to the axle by means of an arm 17 and a link 18, the link 18 being connected with the arm 17 and the axle 12 by means of suitable ball and socket joints.

Referring now to Figure 2, the numeral 20 indicates a cup-shaped base having its walls exteriorly screw threaded at 23 and interiorly screw-threaded at 24 and having an inwardly projecting boss 25 at the center of the bottom thereof for a purpose to be later described. A relatively fixed disc-shaped cap member 27 having a central aperture 28 and an axially extending circumferential flange or boss 29 is secured in the open end of the cup-shaped base member 20 by means of peripheral screw-threads 30 meshing with the screw-threads 24 on the interior of the wall of the cup-shaped member 20. A cup-shaped cap member 32 is secured to the base member 20 by means of interior screw-threads 34 engaging with the exterior screw-threads 23 on the wall of the cup-shaped member 20, an annular chamber 35 being provided between the disk-shaped cap member 27 and the cup-shaped cap member 32. A second annular chamber 37 is provided between the disk-shaped cap member 27 and the bottom and side walls of the cup-shaped base member 20. A tubular cylindrical member 38 extends through the cup-shaped cap member 32 and through the aperture 28 in the disk-shaped cap member 27 and has an enlarged end projecting into the annular chamber 37. The annular chamber 37 is divided into two substantially equal semi-circular chambers by inwardly projecting fixed vanes 40 and 41, and the enlarged end of the member 38 is provided with two oppositely extending vanes 43 and 44 which constitute oscillating pistons movable in the semi-circular chambers of the space 37 relative to the cup-shaped base member 20 and the disk-shaped cap member 27. The space 37 is adapted to be filled with a preferably non-freezable, non-evaporative fluid, and as the vanes or pistons 43 and 44 move in the annular space 37, this fluid will be compressed between the leading side of the vanes or pistons and the fixed vanes or partitions in the annular space 37. Radial ports 45 and 46 are provided in the enlarged end of the member 38 and a space is provided between the end of the member 38 and the boss 25 to permit the fluid to flow from the compression sides of the pistons 43 and 44 to the opposite sides thereof, and a thermostatically controlled valve, to be later described in detail, is mounted in the enlarged end of the member 38 and interposed between the ports 45 and 46 and the space between the end of the member 38 and the boss 25 to control the flow of the fluid from one side to the other of the piston members 43 and 44.

The arm 17 is rigidly secured to the outer end of the member 38 by means of a clamp bolt 50 and serrations 51 provided on the end of the member 38, and a ring of packing material 53 is compressed between a sloping portion of the member 32 and the beveled end of the boss 29 to prevent fluid from leaking out of the shock absorber around the member 38. A spirally wound thermostatic element 60 extends axially through the member 38 and has one end adjustably secured in the member 38 by means of the screw-threaded plug 61, and a screw plug 62 closes the end of the member 38. A cylindrical valve member 65 is rigidly secured to the inner end of the thermostatic member 60 and is rotatable by the thermostatic member relative to the member 38 upon changes in temperature of the atmosphere surrounding the shock absorber. A second valve member 67 in the form of a spool having radial flanges 68 and 69 at either end thereof and an intermediate circumferential groove 70 is rigidly secured in the enlarged end of the member 38, with the groove 70 between the ports 45 and 46. This member 67 is provided with an axial aperture 72 through which the valve member 65 extends and in which the valve member has a close bearing fit.

Referring to Figures 6 and 7, it will be observed that the valve member or spool 67 is provided in the groove 70 with a V-shaped cut, or valley, a portion of which extends through the wall of the valve member into the aperture 72, thereby providing a slot 75 in the valve member having a relatively wide center portion tapering toward each end of the slot.

Referring to Figures 3 and 4, it will be observed that the valve element 65 is provided in the end thereof remote from the thermostatic element 60 with a longitudinal slot 77 having parallel side walls extending axially of the valve member. As illustrated in Figures 8 and 9, a second slot 78 similar to the slot 77 may be provided, displaced by a radial angle of substantially 90° from the slot 77.

The operation of the device is as follows: Whenever the pistons 43 and 44 move relative to the base member 20, the fluid contained in the chamber 37 will be caused to flow from one side to the opposite side of the pistons through ports 45 and 46, and the space between the end of member 38 and boss 25. The valve mechanism will restrict this flow, thereby causing the shock absorber through the arm 17 and link 18 to resist the action of the spring 11.

Up to the present time, no liquid suitable for use in a shock absorber has been found in which the viscosity remains constant during changes in atmospheric temperature. In all cases as the temperature decreases the liquid becomes more viscous and as the temperature increases the liquid becomes thinner and consequently flows more readily. It has, therefore, been found necessary to provide in shock absorbers a thermostatically controlled valve in which the thermostat regulates the valve opening according to the temperature and incidently according to the viscosity of the liquid. As the curve of liquid viscosity diverges somewhat from the temperature curve, it has required a high degree of ingenuity to provide a thermostatically controlled valve in which the valve opening will always be so proportioned to the viscosity of the liquid as to render the dampening action of the shock absorber consistent throughout the entire operative temperature range.

By reason of the tapered form of the slot 75, as the thermostat winds up with decreasing temperature to rotate the element 65 relative to the element 67, the slot 77 will move from a narrow to a relatively wider portion of the slot 75, thereby increasing the effective area through the elements 65 and 67 not in direct proportion to the temperature variations but more nearly in direct proportion to the curve of liquid viscosity, and as the thermostat unwinds with increasing temperature the slot 77 will move first, from a wider to a narrower part of the slot 75 and after the leading edge of the slot 77 passes the end of the slot 75, a double effect including a reduction in both the length and breadth of the aperture will take place. In the case of the modified form utilizing two slots as illustrated in Figures 8 and 9, the increasing area of the passageway through the valve element will follow the viscosity curve up to the point where the slot 77 passes the widest portion of the slot 75. If only the slot 77 were provided and if the temperature continued to decrease from this point, the area of the passageway would decrease and would no longer follow the viscosity curve of the fluid. This defect, however, has been obviated by the provision of the second slot 78 which comes into juxtaposition with the slot 75 at the time the slot 77 passes from the wide toward a narrower portion of the slot 75. The result of this construction is that the rate of increase of the passageway through the valve closely follows the rate of increase of viscosity of the fluid throughout the entire operative temperature range of the shock absorber.

Having now described my invention so that others skilled in the art may clearly understand the same, what I desire to secure by Letters Patent is as follows:

What I claim:

1. In a thermostatically controlled valve for a vehicle shock absorber, an outer valve member provided with an elongated circumferential slot therethrough, an inner member rotatable relative to said outer member provided with a flat portion underlying said slot, and a thermostat inter-acting between said members to rotate said inner member relative to said outer member, whereby the area of the opening through said slot will increase or decrease in direct proportion to the rate of increase or decrease of the viscosity of the shock absorber liquid throughout the entire operative temperature range of said shock absorber.

2. In a thermostatically controlled valve for a vehicle shock absorber, an inner valve member actuated by said thermostat, an outer valve member surrounding said inner member, said inner member being rotatable relative to said outer member, said outer member being provided with a V-shaped slot, and means in said inner member cooperating with said slot to cause the area of the opening through said valve to increase or decrease in direct proportion to the rate of increase or decrease of the viscosity of the shock absorber liquid throughout the entire operative temperature range of said shock absorber.

3. In a thermostatically controlled valve for a vehicle shock absorber, an inner valve member actuated by said thermostat, an outer valve member surrounding said inner member provided with a V-shaped slot having a relatively wide central portion and tapering inwardly toward the opposite ends thereof, said inner member being rotatable relative to said outer member, and means in said inner member for causing the area of the opening through said valve to increase or decrease in direct proportion to the rate of increase or decrease of the viscosity of the shock absorber liquid throughout the entire operative temperature range of said shock absorber.

4. In a thermostatically controlled valve for a vehicle shock absorber, an inner valve member actuated by said thermostat, an outer member provided with a V-shaped slot having a relatively wide central portion and tapering inwardly toward the opposite ends thereof, said inner member being rotatable relative to said outer member and provided with a longitudinal slot cooperating with the V-shaped slot in said outer member to cause the area of the opening through said valve to increase or decrease in direct proportion to the rate of increase or decrease of the viscosity of the shock absorber liquid throughout the entire operative temperature range of said shock absorber.

5. In a thermostatically controlled valve for a vehicle shock absorber, an inner valve member actuated by said thermostat, an outer valve member surrounding said inner member and provided with a V-shaped slot having a relatively wide central portion and tapering inwardly toward the opposite ends thereof, said inner member being rotatable relative to said outer member and provided with a plurality of longitudinal slots cooperating with the V-shaped slot in said outer member to cause the area of the opening through said valve to increase or decrease in direct proportion to the rate of increase or decrease of the viscosity of the shock absorber liquid throughout the entire operative temperature range of said shock absorber.

6. In a thermostatically controlled valve for a vehicle shock absorber, an inner valve member actuated by said thermostat, an outer valve member surrounding said inner member and provided with a V-shaped slot having a relatively wide central portion and tapering inwardly toward the opposite ends thereof, said inner member being rotatable relative to said outer member and provided with a pair of longitudinal slots spaced apart less than ninety degrees around the circumference thereof and cooperating with said V-shaped slot to cause the area of the opening through said valve to increase or decrease in direct proportion to the rate of increase or decrease of the viscosity of the shock absorber liquid throughout the entire operative temperature range of said shock absorber.

FRED E. ULLERY.